Figure 1:
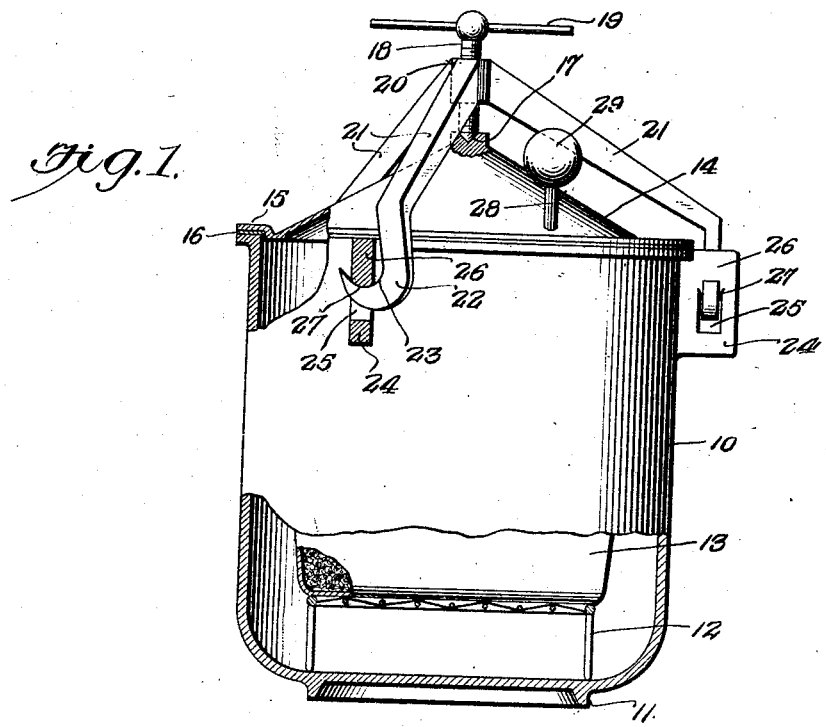

Aug. 4, 1925.

A. F. GILLET 1,548,195

COOKER

Filed Sept. 24, 1923

Alexis F. Gillet,
INVENTOR.

BY Arthur H. Sturges
ATTORNEY.

Patented Aug. 4, 1925.

1,548,195

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA.

COOKER.

Application filed September 24, 1923. Serial No. 664,400.

*To all whom it may concern:*

Be it known that I, ALEXIS F. GILLET, a citizen of the United States, residing at Omaha, in the county of Douglas and State of Nebraska, have invented certain new and useful Improvements in Cookers, of which the following is a specification.

The present invention relates to cookers of the steam and water pressure type.

The invention has for an object to provide a kettle or vessel with a cover for sealing the same and improved means for fastening the cover in place so as to equalize the pressure of the fastening means at all sides of the cover and to admit of the quick and easy application and removal of the cover and the fastening means.

Another object of the invention is to provide a relatively strong interlock between the fastening means and the body of the kettle for resisting considerable pressure and a novel type of device for facilitating the interlocking of the parts and guiding the parts in the interlocking position as they are drawn taut.

Frequently, water contains a high percentage of alkali, lime or other mineral and this percentage of the mineral is perceptibly increased in the ordinary cooking operation. With the cooker of this invention the amount of liquid used remains the same throughout the entire cooking operations, and consequently a definite and predetermined result may be accomplished, no diluting of the cooking substance taking place, and no concentration of the mineral matter in the water.

A further object of the invention is to provide a high pressure water and steam wherein the food, water and steam may occupy any or all parts of the vessel as may be desired.

A still further object of the invention is to provide a kettle or vessel with a plurality of outstanding ears having vertically elongated slots therein and curved upper marginal edges for the slots, the ears being provided with a reinforcement above the slots for resisting pressure of hooks which may be engaged through the ears, and to provide a spider with a rocking support on the top of the cover permitting of the settling of the spider uniformly over the cover and providing the spider with rigid hooks on its outer ends with receding curved edges for engagement through the ears to advance the hooks as the latter are clamped or raised with the spider.

With the foregoing and other objects in view, the invention will be more fully described hereinafter, and will be more particularly pointed out in the claims appended hereto.

In the drawings, wherein like symbols refer to like or corresponding parts throughout the several views.

Figure 2:
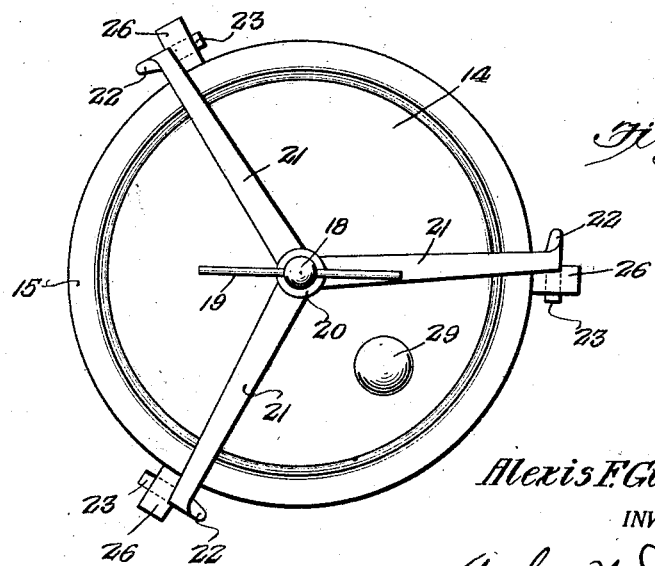

Figure 1 is a side elevation, partly in section, of a steam and water cooker constructed according to the present invention, and Figure 2 is a top plan view of the same.

Referring to the drawing 10 designates a kettle or vessel of suitable construction, and shown in the present instance as cylindrical and provided upon its bottom with a depending supporting flange 11. Within the bottom of the receptacle 10 is placed a suitable stand or support 12 for receiving an inner receptacle 13 adapted to contain food or articles to be cooked and steamed.

The upper end of the kettle 10 is adapted to be closed by a cover 14 of conical construction and which has at its base an anular flange 15 adapted to seat upon the upper edge of the kettle 10 and center the cover 14 thereon. A suitable backing washer or gasket 16 is placed beneath the flange 15 for sealing the same upon the upper end of the kettle. At the apex of the cover 14 is an upwardly flaring conical seat 17 which is preferably formed in the upper side of a boss or enlargement of the cover 14 and which is adapted to receive a clamping screw 18 having its lower point of conical shape adapted to loosely fit in the seat 17 so as to permit the screw 18 to rock in the seat and for substantial and universal movement on the cover.

The upper end of the clamping screw 18 is provided with a transversely extending handle 19 adapted to be grasped by the hand for turning the screw 18. Mounted upon the screw 18 is a spider comprising a hub 20 which is threaded upon the screw 18 and provided with a plurality preferably three as shown, of downwardly diverging arms 21 arranged to overhang the cover 14 and preferably being of sufficient length to extend beyond the flange 15 of the cover.

The outer ends of the arms 21 are carried downwardly to extend below the cover 14 and are curved in the same direction to form hooks 22, the bills of which are relatively sharp and the inner edges 23 of the hooks being arched downwardly from the bills so as to provide curved seating edges or shoulders.

The kettle or vessel 10 is provided at its upper end portion and upon its outer side with a plurality of radially extending ears 24 which are equal in number to the number of hooks 22 and which are of considerable vertical depth. These ears 24 are provided with vertically elongated slots 25 formed toward the lower ends of the ears so as to leave a relative thick reinforced portion 26 at the upper ends of the ears. The slots 25 are adapted to receive the hooks 22 therethrough, and the upper marginal edges of the slots 25 are rounded as shown at 27 to correspond to the curvature of the seating edges 23 of the hooks and so as to advance the hooks 22 forwardly into the slots 25 of the ears when the spider is elevated.

It will also be noted that the complementary curved edges 23 and 27 form a relatively wide and substantial seat between the ears and the hooks so as to evenly distribute pressure upon the ears and prevent the breakage thereof.

The cover 14 is preferably provided with a vent tube 28 at one side thereof and which extends upwardly and supports thereon a ball 29 of ordinary type with an opening in its lower side adapted to receive the upper end of the tube 28, the weight of the ball holding it in place upon the upper end of the tube for sealing the latter. In the present instance it has been found practical to make the ball of sufficient weight as to require steam pressure of twenty pounds per square inch to lift the ball from its seat on top of the tube and for thus venting interior of the kettle 10. This however may of course be varied to meet circumstances of use and character of the vessel.

It will be noted that when the cover 14 is in place the spider is placed over the cover with the conical point of the clamping screw 18 in the conical seat 17, when the spider is free to rock on the cover in order that the hooks 22 may accommodate themselves to the ears and be automatically advanced through the slots. It will also be noted that the hooks 22 are inclined backwardly from the open sides of the hooks at a slight angle from the outer ends of the spider arms 21.

This further insures the seating of the hooks and the even distribution of the pressure between the ears and the spider arms. The hooks 22, having the relatively sharp bill and the depressed edges 23, are substantially of wedge shape so as to gradually and evenly bind within the ears as the spider is raised upon the clamping screw 18.

It will be futher observed that the ears extend laterally from the ends of the arms 21 and all in the same direction so that the hooks may be simultaneously and quickly engaged and disengaged relatively to the ears 24.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A steam and water cooker comprising a kettle, a cover for the kettle, a spider arranged over the cover, a clamping screw mounted centrally in the spider and seated at its lower end upon the cover for lifting the spider when the clamping screw is turned, said spider having a plurality of depending hooks upon its outer ends with all of the hooks extending in the same direction, and a plurality of ears corresponding to the number of hooks outstanding from the upper end of the kettle and having vertical slots therein adapted to receive said hooks, said hooks each having a depressed arched inner edge emerging from the bill of the hook, said ears each having the upper marginal edge of its slot transversely rounded to receive said arched inner edge of the corresponding hook against said arched and rounded surfaces of the hooks and ears respectively corresponding in curvature to each other for seating the hooks and equalizing pressure upon the ears.

2. A steam and water cooker comprising a kettle ears outstanding from the upper end of the kettle, said ears having vertical slots therein with transversely convexed upper marginal edges, a cover for the kettle, a spider arranged over the cover, a clamping screw carried by the spider and engaging said cover to raise the spider upon rotation of the screw, said spider having laterally extending hooks upon its outer ends all opening in one direction, said hooks having inner concave edges corresponding substantially to the convexity of the upper edges of the slots and emerging from the bill of the hook, and inclined backwardly therefrom for advancing the hooks uniformly through the ears as the spider is raised.

In testimony whereof, I have affixed my signature in presence of two witnesses.

ALEXIS F. GILLET.

Witnesses:
ARTHUR H. STURGES,
HIRAM A. STURGES.